United States Patent
Bareis et al.

Patent Number: 5,575,193
Date of Patent: Nov. 19, 1996

[54] ROTARY SLIDE VALVE FOR ASSISTED STEERING SYSTEMS

[75] Inventors: Helmut Bareis, Eschach; Gerhard Ruf, Hüttlingen, both of Germany

[73] Assignee: ZF Friedrichshafen AG., Friedrichshafen, Germany

[21] Appl. No.: 356,352

[22] PCT Filed: Jun. 21, 1993

[86] PCT No.: PCT/EP93/01570
§ 371 Date: Mar. 2, 1995
§ 102(e) Date: Mar. 2, 1995

[87] PCT Pub. No.: WO94/00329
PCT Pub. Date: Jan. 6, 1994

[30] Foreign Application Priority Data

Jun. 24, 1992 [DE] Germany ............ 42 20 624.3

[51] Int. Cl.[6] .................................................. F15B 9/10
[52] U.S. Cl. .................................... 91/375 A; 91/389
[58] Field of Search ............... 91/375 A, 375 R, 91/389

[56] References Cited

U.S. PATENT DOCUMENTS 4,877,100 10/1989 Emori et al. .................... 91/375 A
4,966,192 10/1990 Umeda ........................... 91/375 A

*Primary Examiner*—F. Daniel Lopez
*Attorney, Agent, or Firm*—Larson & Taylor

[57] ABSTRACT

This invention relates to a rotary slide valve (5, 6) with a centering device (25) that is loaded by the force of a spring (31). The centering device is placed inside the valve housing (1) without any need for additional space in radial direction. In addition, the reaction pressure required by the steering system is reduced. According to the invention, spring (31) presses upon a reaction piston (32) that acts with a centering piece (24) upon the roller body (30) of the centering device (25). Between a lid (35) and the reaction piston (32), there is a reaction chamber (37) that can be provided with a variable pressure. At faster driving speeds, a pressure supporting spring (31) in the reaction chamber (37) acts upon the face (41) of the reaction piston (32). In this way, a smaller spring can be used and construction space can be saved because the force of the reaction pressure is additive with the force of the spring (31).

5 Claims, 2 Drawing Sheets

ROTARY SLIDE VALVE FOR ASSISTED STEERING SYSTEMS

BACKGROUND OF THE INVENTION

1. Field of the Invention

This invention relates to a rotary slide valve for assisted steering systems with a valve bushing placed in a housing and enclosing a rotary slide. These two valve components are arranged rotatably with respect to each other. The valve bushing is connected with a drive shaft and the rotary slide is connected with a steering shaft that carries a manual steering wheel. A rotatable rod is inserted between the valve bushing and the rotary slide. Furthermore, between the valve bushing and the rotary slide, there is provided a centering device that consists of inclined surfaces with centering bodies located therebetween and a spring means useful for precise central positioning of the rotary slide valve. The force of the spring that acts on the centering device can be superposed by an adjustable pressure force that works in a reaction chamber. The pressure force can be adjusted in assisted steering systems, for example, by means of a speed dependent signal. In this way, a small reaction force works on the manual steering wheel when driving slowly, whereas a comparatively strong reaction force is at work when driving fast. By means of this, one can impart good roadway surface contact and thus a good steering sensation, especially at faster speeds.

2. Description of the Prior Art

From a prospectus of the firm of TRW dating back to the year 1990 entitled "Rack and Pinion Steering," pages 10 and 11, a steering system is known that is provided with a rotatable rod connecting the steering shaft and a drive shaft, as well as a centering device that resets a rotary slide valve into the exact middle position. In this kind of assisted steering, the rotary slide is a component of the steering shaft and the valve bushing is a component of the drive shaft. The opposing fronts of a spring-loaded reaction disc that is connected with the steering shaft and of the valve bushing are provided with opposing recesses that form inclined surfaces to receive catch balls. The steering shaft with the reaction disc can be turned with relation to the valve bushing only when the torque, exercised by the driver on the manual steering wheel, is sufficient to overcome the spring prestress. At that point, the rotary slide valve can be deflected in order to select a pressure in the pertinent servomotor. In front of the reaction disc on the side of the catch balls there is a pressure chamber with an outlet duct whose return cross-section is adjustable. By adjusting the oil pressure it is possible to change the spring prestress and thus the torque that is required on the manual steering wheel to activate the auxiliary power. The regulation of the oil pressure behind the reaction disc is accomplished by a magnetic valve that is controlled by an electronic control unit that responds to the speed-dependent signals. The diameter of the reaction disc must be sufficiently large so that—to reduce the comparatively strong spring force—a sufficiently strong hydraulic pressure force can act as a counterforce. This means that the valve housing must be made large in the area of the reaction disc and the spring.

SUMMARY OF THE INVENTION

The basic purpose of the invention is to provide the most compact design for a rotary slide valve for which the centering device does not require additional construction space in a radial direction. In addition, it is desirable to reduce the quantity of hydraulic pressure required to generate the reaction force. These problems are solved by the present invention.

According to the main feature of the invention, a reaction piston is installed between the spring and the centering device, whereby the reaction chamber lies between the reaction piston and a lid. The reaction piston can be easily sealed in the valve housing and in the lid. In this arrangement, the reaction chamber also performs the function of the spring chamber so that the hydraulic force supports the spring force. The spring therefore can be made with smaller dimensions, as a result of which, the spring will also require a smaller installation space.

According to a more preferred embodiment, the spring is supported against the reaction piston by a needle bearing. The movement of the piston is guided by an axial guide on balls. In that way, an almost friction-free and exact response of the centering device is attained.

According to another preferred embodiment, the inclined surfaces—that cooperate with the rotary slide—are part of a centering piece that is firmly connected with the reaction piston once it is aligned with the hydraulic center. This embodiment has the advantage that—after the rotatable rod has been pinned together with the rotary slide in the hydraulic middle—the inclined surfaces of the centering device can be precisely adjusted with respect to each other toward the hydraulic center. As a result, angular errors and other production tolerances between the rotary slide valve and the centering device can be reliably avoided.

According to yet another preferred embodiment, the centering piece is attached to the reaction piston by means of laser welding. Using this attachment technique, the mechanical properties of the comparatively small components can be preserved, i.e., there is no heat distortion.

According to another embodiment of the invention, the reaction chamber 37 is connected with the oil return via a restriction 29. By means of the restriction 29, the intermediate pressure—that is lowered with respect to the pump pressure—can be adjusted as a reaction pressure in the reaction chamber.

This invention is explained in greater detail with the help of a practical example illustrated in the drawing.

DETAILED DESCRIPTION OF THE PREFERRED EMBODIMENTS

Figure 1:
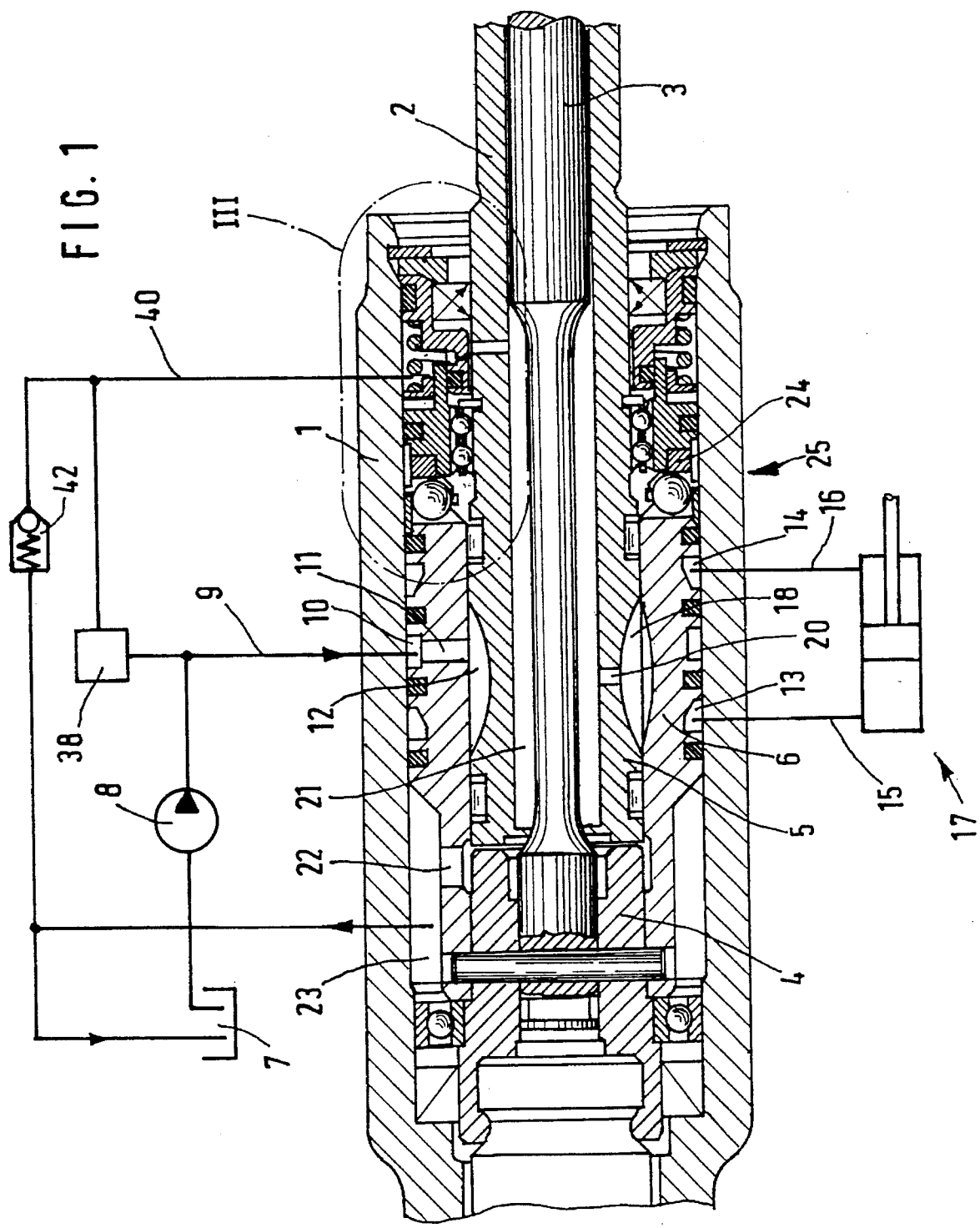
FIG. 1 is an enlarged longitudinal profile through a rotary slide valve.

In the longitudinal profile according to FIG. 1, a steering shaft 2, positioned in a valve housing 1, is connected via a rotatable rod 3 with a drive shaft 4 which, for example, carries a pinion of a rack-and-pinion gear (not shown). A lower segment of the steering shaft 2 is made in the form of a rotary slide 5 that extends into a valve bushing 6 which is connected with the drive shaft 4. Rotary slide 5 and valve bushing 6 together form a known rotary slide valve with cooperating control grooves and accompanying boreholes. Between steering shaft 2 and drive shaft 4, there are provided stops (not shown) that permit a limited amount of rotation for the deflection of the rotary slide valve 5, 6.

Tank 7 has a high-pressure pump 8 connected thereto. High-pressure pump 8 is also connected via a pressure line 9 and a ring groove 10 with boreholes 11 of the valve bushing 6.

Boreholes 11 empty into axial feed grooves 12 of rotary slide 5. Upon rotation of rotary slide valve 5, 6, the feed grooves 12 come into contact with the axial cylinder grooves (not shown) of valve bushing 6 that connect to ring grooves 13 and 14. These ring grooves 13 and 14 lead, via pressure lines 15 and 16, into the pressure chambers (not shown) of a servomotor 17. Finally, rotary slide 6 also includes axial return grooves 18 that empty into an inner chamber 21 via boreholes 20. Inner chamber 21 is connected via a borehole 22 of valve bushing 6 and a chamber 23, to tank 7.

A centering device 25 is provided between valve bushing 6 and a centering piece 24 that is firmly connected with the steering shaft 2. Centering device 25 (FIG. 2) consists of inclined surfaces 26 and 26A in the face of valve bushing 6 and corresponding inclined surfaces 27 and 27A in centering piece 24. Roller bodies 30 contained in a cage 28 are clamped between inclined surfaces 26, 26A, 27, and 27A.

Figure 2:
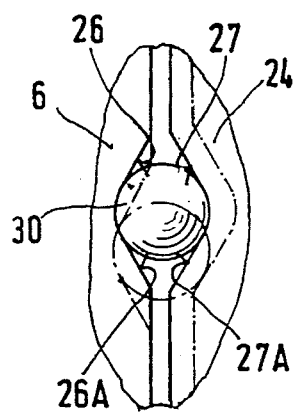
FIG. 2 is a partial view of the centering device looking in the direction of arrow II in FIG. 3 with the ball cage omitted.

FIG. 2 shows centering device 25 in the central position or neutral position with the cage 28 omitted, and in an operating position or initial regulating position (shown by a broken line).

Figure 3:
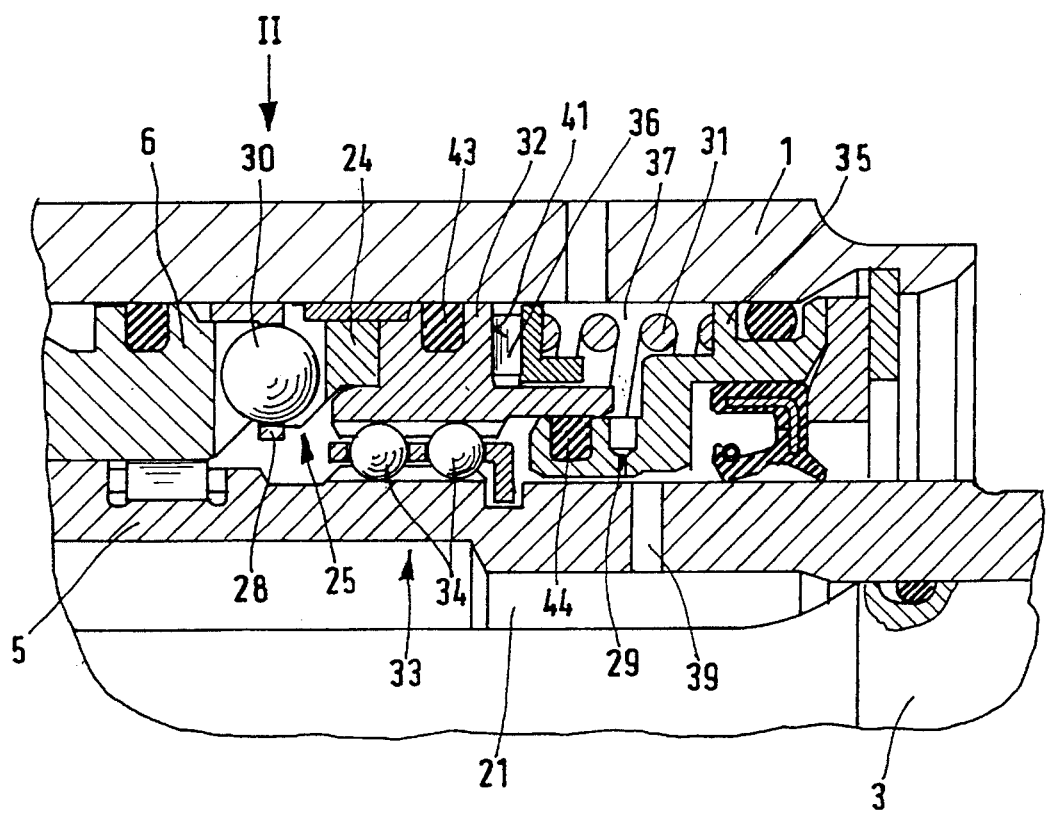
FIG. 3 shows detail III in FIG. 1 in the form of an illustration that is enlarged with respect to FIG. 1.

As one can best see from FIG. 3, according to the invention, a reaction piston 32 is positioned between a spring 31 and centering device 25. In this way, reaction piston 32 is retained upon steering shaft 2, in a non-rotating fashion, by an axial guide 33. To reduce the axial friction, reaction piston 32 is supported in axial guide 33 by balls 34. Centering piece 24 is advantageously connected with the reaction piston 32 by means of laser welding. Spring 31 is supported, on the one hand, upon a lid 35 that is fixed in the valve housing 1 and that is made in the form of a seal carrier, and on the other hand, via a needle bearing 36 on reaction piston 32. Between reaction piston 32 and lid 35 lies a reaction chamber 37 that also functions as a spring chamber. In lid 35 there is a restriction 29 that connects the reaction chamber 37 via a borehole 39 of steering shaft 2 with the inside chamber 21 and thus also with tank 7. Reaction chamber 37 is sealed by means of a seal arrangement 43 associated with reaction piston 32 and another seal arrangement 44 associated with lid 35.

The pressure line 9 shown in FIG. 1 is connected with ring groove 10 via a magnetic valve 38 and a line 40, and also with the reaction chamber 37. At low driving speeds, the magnetic valve 38 is closed. In case of a relative rotation of the rotary slide 5 with respect to valve bushing 6, the rotatable rod 3 must be turned by the axial force generated by the roller bodies 30 that ride up on inclined surfaces 26, 26A, 27 and 27A in order to steer the servomotor 17 (see the broken line in FIG. 2). As a result of this axial force, reaction piston 32 is shifted slightly against spring 31. This axial force is still comparatively small because, after all, for example, when parking the car, it should be possible for the rotary slide valve 5, 6 to respond to a minor turning force on the manual steering wheel.

At faster speeds, the magnetic valve 38 is opened and a speed-dependent oil stream flows via line 40 to the reaction chamber 37. The dynamic pressure generated by restriction 29 acts as a reaction pressure upon a face 41 of reaction piston 32. This reaction pressure is additive with the force of spring 31. To overcome the centering device 25 and to deflect the rotary slide valve 5, 6, more manual turning force is required. This turning force, transmits the so-called steering sensation when driving fast. The auxiliary power steering unit, so to speak, becomes stiffer.

A cutoff valve 42 can be provided to limit the reaction pressure starting at a certain speed (FIG. 1).

We claim:

1. Rotary slide valve for use with hydraulic power steering units, comprising:

a housing, a valve bushing located in the housing, a rotatable slide located within the valve bushing to form a rotary slide valve, a drive shaft connected with the valve bushing of the rotary slide valve, a steering shaft connected with the rotary slide of the rotary slide valve and to a manual steering wheel, a rotating rod positioned between the valve bushing and the rotary slide of the rotary slide valve, a reaction chamber defined by a reaction piston and a lid, said reaction chamber including feed grooves for feeding a pressurized fluid to the reaction chamber and return grooves for removing fluid from the reaction chamber, a centering device positioned between the valve bushing and the rotary slide of the rotary slide valve, said centering device including a plurality of inclined surfaces at least two of which are associated with the reaction piston, a plurality of roller bodies located between said inclined surfaces, and a spring located in the reaction chamber and supported against the reaction piston by a needle bearing, said spring being used for the precise positioning of the rotary slide valve in a central position by exertion of a pressure force on the roller bodies via the reaction piston, and means for applying a speed-dependent variable pressure in the reaction chamber to the same side of the reaction piston as is acted upon by the spring whereby a speed-dependent steering resistance is generated in the manual steering wheel.

2. Rotary slide valve according to claim 1 wherein the reaction piston is mounted for axial movement on balls positioned in an axial guide.

3. Rotary slide valve according to claim 1 wherein two of the inclined surfaces are formed in a centering piece which is connected with the reaction piston after the reaction piston is aligned with a hydraulic center of the rotary slide valve.

4. Rotary slide valve according to claim 3, wherein the centering piece is attached to the reaction piston by laser welding.

5. Rotary slide valve according to claim 1, wherein the reaction chamber is connected to the return grooves via a restriction.

\* \* \* \* \*